Figure 1:
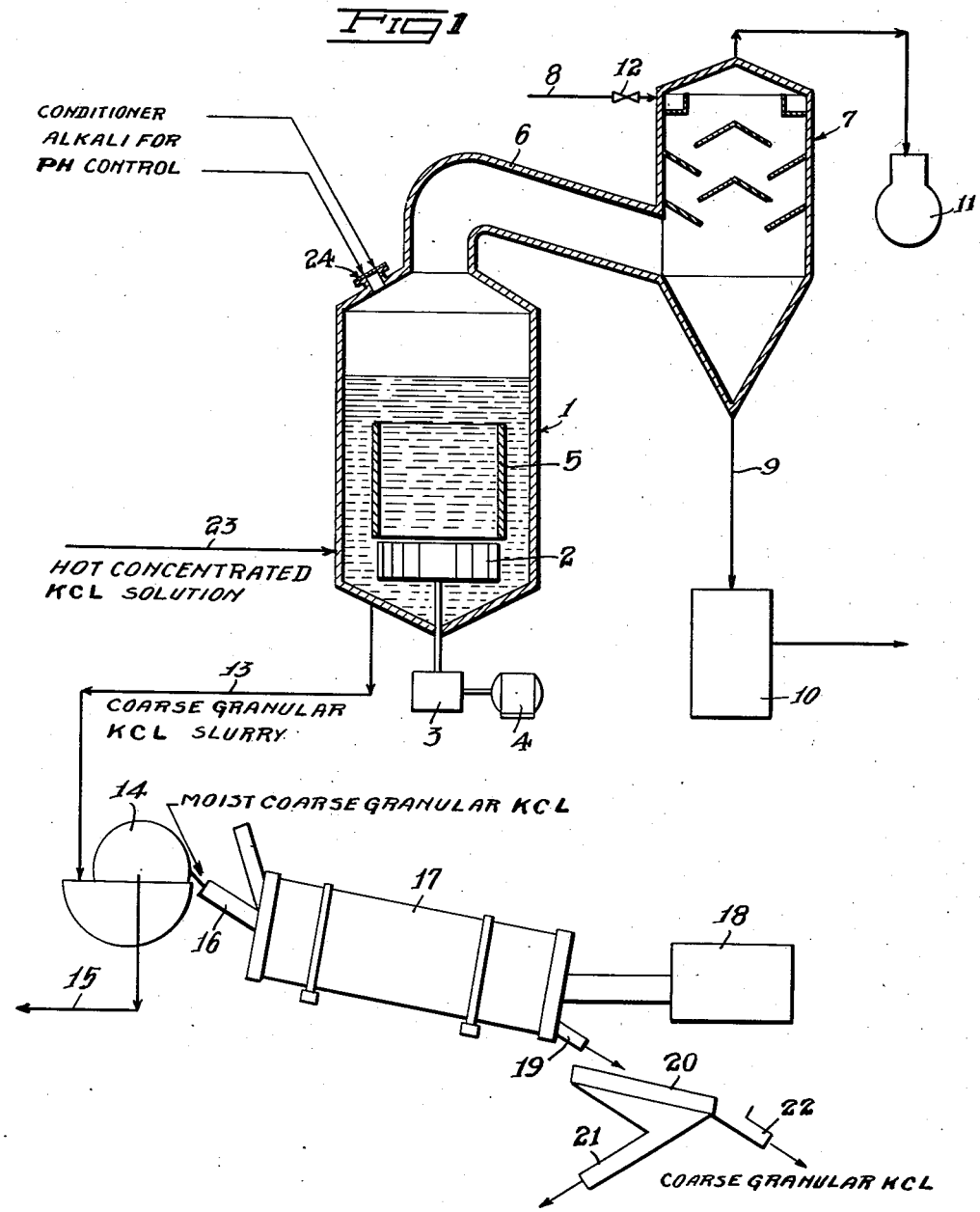

Patented May 24, 1949

2,470,822

UNITED STATES PATENT OFFICE 2,470,822

PROCESS FOR MANUFACTURING COARSE GRANULAR POTASSIUM CHLORIDE

Arthur Kenneth Johnson, Hawthorne, and Henry B. Suhr, Trona, Calif., assignors to American Potash & Chemical Corporation, Trona, Calif., a corporation of Delaware Application August 16, 1947, Serial No. 769,074

11 Claims. (Cl. 23—300)

This invention relates to a process for producing potassium chloride in a coarse granular form.

It is an object of this invention to provide a process by which potassium chloride may be crystallized from solution in the form of discrete crystals of relatively large size.

It is a further object of the invention to provide a process which will produce potassium chloride crystals having free-flowing characteristics and which will not cake.

Heretofore, previous known methods for obtaining a non-caking product in the form of discrete crystals of potassium chloride of relatively large size have been time-consuming and, therefore, expensive. For instance, large crystals of potassium chloride may be formed by slow cooling in large vats. The crystals thus formed, however, were usually extremely large or badly agglomerated.

Another process which has been developed for the production of large crystals has been that wherein slightly supersaturated solutions have been made to flow upward through seed beds of the crystals.

The major part of the potassium chloride now crystallized from solutions is used for argicultural purposes. This material is dusty and cakes badly on standing. A typical screen analysis of potassium chloride of the agricultural grade as sold by the American Potash & Chemical Corporation is:

| Screen Mesh (Tyler) | Cumulative Percentage Retained by the Screen |
|---|---|
| 16 | 0.5 |
| 20 | 0.6 |
| 28 | 0.8 |
| 35 | 2.5 |
| 48 | 11.3 |
| 60 | 18.7 |
| 80 | 45.3 |
| 100 | 66.4 |
| 200 | 97.2 |

All processes used for the production of large sized crystals must perform two functions. First, they must inhibit nuclei formation and, second, they must bring supersaturated liquors in contact with growing crystals. The first of these functions is based upon the consideration that there is a definite quantity of material in the solution from which crystals will be formed. Therefore, the smaller the number of nuclei, the larger will be the crystals grown from the nuclei. The second of these functions is based upon the knowledge that supersaturated solutions will deposit material upon nuclei of growing crystals in contact with these solutions. Therefore, there must be a flow of these supersaturated solutions past the nuclei or over the crystal surfaces. If such flow is not maintained, the supersaturated solutions will finally form new nuclei which would be detrimental to the formation of large crystals.

Nuclei are formed spontaneously from highly supersaturated solutions; they are formed by the impact of crystals against container walls; or they are formed by disturbance created by violent agitation. Previous methods to control nuclei formation have included the avoidance of extreme supersaturation or of extremes in agitation. However, to maintain the flow of supersaturated liquor over the crystal surfaces, some agitation is necessary.

Therefore, to reduce the number of nuclei formed and still maintain adequate flow of liquor past the crystal surfaces, a compromise must be made on the amount of agitation. In some processes, special design of equipment permits increases in agitation without the disturbances which create nuclei.

We have developed a process for producing potassium chloride in the form of relatively large discrete crystals, which process is less time-consuming and, therefore, less expensive than previous known processes. We have discovered, first, that the formation of crystal nuclei from solutions containing potassium chloride can be inhibited by the addition of a material which may be termed a nuclei formation inhibiting agent. For such an agent, we found that there may be employed any of the oxides or salts of the group of metals including iron, aluminum, thorium, zinc, bismuth and lead. Of these inhibiting agents, we have found that the ordinary red lead $Pb_3O_4$ is the most efficacious. We do not desire to be understood as asserting that the aforesaid inhibiting agents are capable of preventing nuclei formations under all conditions; but merely that they are capable of the hindering or retarding the formation of nuclei so that, in combination with the other features of the process hereafter described, they are effective to permit the process to produce the desired large crystals of potassium chloride.

We have further discovered that the production of the desired large size crystals is dependent upon the use of a solution which has a pH of at least 8.5. When the solution from which the potassium chloride is to be precipitated naturally possesses such alkalinity that its pH is greater that 8.5, it will be suitable for the process of the present invention; but if the solution is more acid then, before the crystallizing process of the present invention is applied, alkaline reagents should be added, such as but not limited to an hydroxide or carbonate of potassium or sodium, in order to increase the alkalinity to a pH of at least 8.5.

By the use of solutions having a pH in excess of 8.5 and containing a suitable nuclei formation inhibiting agent, it is possible to produce discrete large crystals of potassium chloride.

The invention further embodies a discovery that by suitable control of the rate of cooling and the rate of agitation, it is possible to provide a process of producing large crystals of potassium chloride which is not so time-consuming as to be prohibitive commercially. In order to provide such a desirable commercial process, there must be combined with the use of the inhibitor and proper pH, a suitable rate of cooling of the solution and type of agitation. While the invention may, for some forms at least, be carried out with various types of apparatus, it is preferably carried out using the type of apparatus and process for crystallizing solutions described in the Burke et al., Patents Nos. 1,997,277 and 2,130,065, issued April 9, 1935, and September 13, 1938, respectively. As disclosed in said patents, crystallization is effected by passing the solution of the salt to be crystallized into a crystallizing zone in which a body of solution is maintained under a pressure below atmospheric sufficient to evaporate water from the body of said solution and cool the surface of the body of said solution through the removal of the heat of vaporization, while continually subjecting the body of said solution within the zone together with the crystals present to a circulation to and from the evaporating surface of the liquid at a rate substantially in excess of the settling rate of the crystals present. In a process of this kind, there is normally provided a well in the evaporator and the circulation is down through the well and up around the exterior of the well.

The process, as carried out, may be conducted either as a batch process or as a continuous process. In the match process, the cooling should be carried out slowly at the start of the process. As the total surface area of the crystals in the cooling solution increases, the rate of cooling can, likewise, be increased. With each particular type of apparatus in which the present invention is carried out, there are conditions of operation with regard to both cooling rate and agitation which will permit a maximum sized crystal to be produced. With each type of apparatus, however, these most favorable conditions must be empirically determined. Once determined, however, the operator need never again concern himself with redetermining these factors, but need only follow a standard procedure. Utilizing the circulating-well apparatus described in the aforementioned Burke patents, we discover these most favorable conditions to be when the cooling rate does not exceed 1.0° F. per minute and generally when the cooling rate lies between 0.5 and 1.0° per minute. Using such a rate of cooling, the maximum circulation is employed which can be carried out without shocking the solution so as to induce nuclei formation and the maximum circulation suitable is thus readily determined by the operator.

The process of the present invention is also adapted to be carried out as a continuous process in which multi-stage cooling is utilized, the solution and crystals from each cooler being transferred to each successive cooler. In such a process, in order to obtain the maximum size crystals, the cooling in the first stage must be restricted, so that there is no sudden temperature drop at the start of the process, while the solution is highly concentrated. As the amount of crystal surface increases in the solution, higher rates of cooling may be tolerated in succeeding stages and, therefore, in the preferred continuous process of the present invention, the rate of cooling is increased progressively through the multi-stage cooling operation so that a greater temperature drop is effected in the latter stages than in the earlier. Likewise, the manner of agitation should be progressively controlled. Agitation in the first cooler should be less than that carried out in the succeeding stages. Agitation must be kept at a minimum at the start of the operation, in order to prevent the mechanical formation of excessive nuclei. As crystals grow, the greater amount of crystal surface on which potassium chloride may be deposited reduces the tendency of the solution to form new nuclei and, therefore, both greater rates of agitation as well as greater rates of cooling may be applied.

We have also discovered that two other factors contribute to producing large crystals of coarse granular potash.

The first of these additional discoveries is the use of seed to take the place of nuclei which must otherwise be formed. We have stated hereinbefore that in the continuous process it is necessary to cool carefully in the first stage to avoid the formation of an excess number of nuclei but that succeeding stages might be cooled more rapidly as the presence of solid material will rapidly absorb the supersaturation. The addition of seed in the first stage will therefore not only tend to prevent the formation of nuclei but will take the place of these nuclei as crystals on which potassium chloride can be precipitated. In addition this seed will also tend to absorb much more rapidly the supersaturation caused by cooling and will make the first-stage cooling step less difficult. In addition, if a fraction of the finished coarse product is used as seed material, it will contain a small fraction of inhibitor as an impurity which is advantageous.

In addition to using seed for the formation of larger crystals, we have found that larger crystals can be formed by cooling over a wide temperature range. In normal practice, we have found it convenient to cool from the boiling point of the original potassium chloride solution to approximately 130° F. However, we have discovered that if we begin the process with a saturated solution of potassium chloride under greater than atmospheric pressures and at temperatures corresponding to these increased pressures, we produce coarse granular potassium chloride much larger in size than that material produced by cooling through the shorter temperature range. We have produced coarse granular potassium chloride in this manner using saturated solutions under approximately fifteen atmospheres pressure and in the neighborhood of 390° F. These materials have been prepared without the use of seeding which is beneficial but not necessary to the process. The pressures and temperatures though feasible, require that special high-pressure equipment be used and that the process be carried out in autoclaves. The use of these pieces of equipment is not economcal as they do not lend themselves readily to continuous production and, therefore, we have not preferred such equipment.

Figure 2:
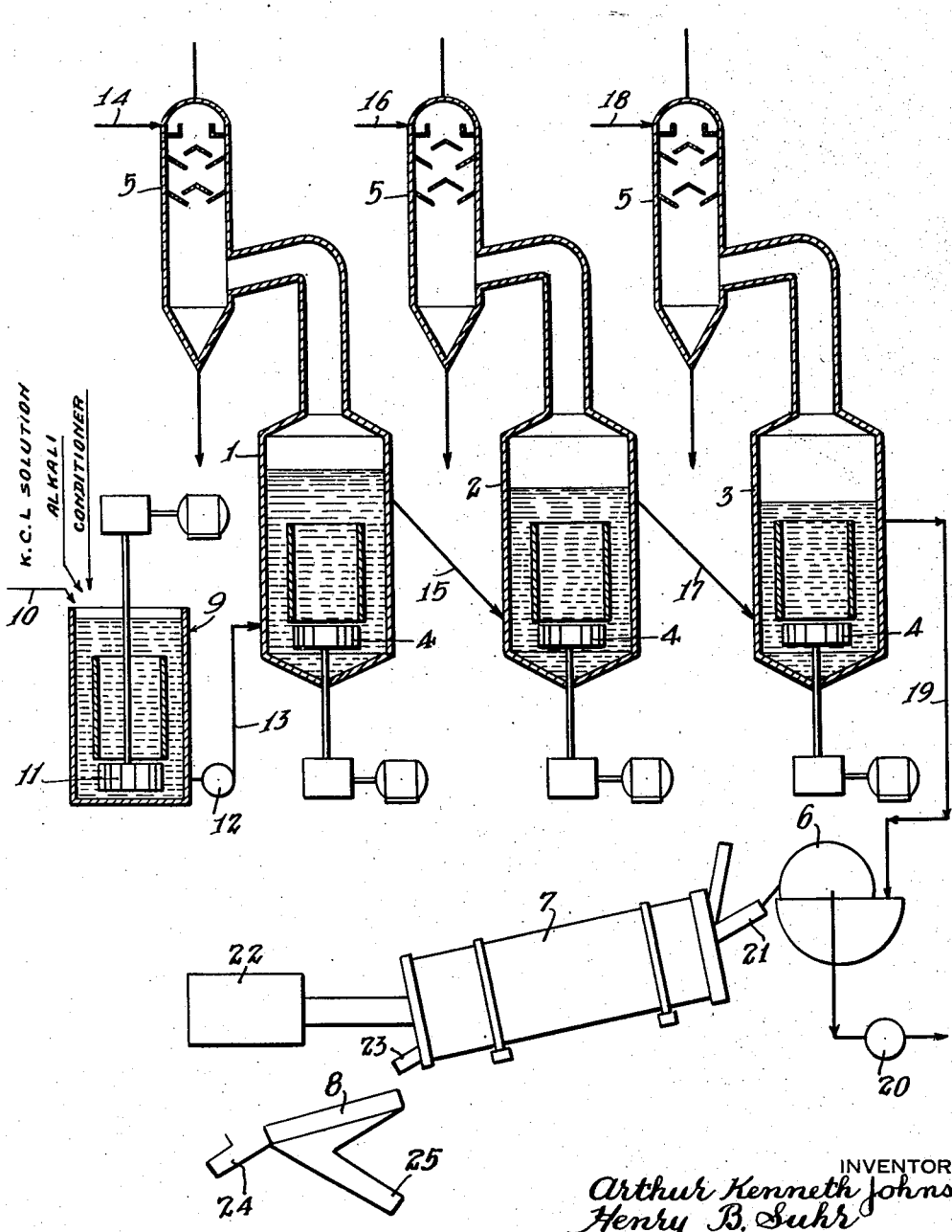

The process of the present invention will be more completely understood from the following description of two preferred examples of the process, which description is given in connection with the accompanying drawings, in which:

Figure 1 is a diagrammatic illustration of an apparatus suitable for carrying out a batch process; and Figure 2 is a diagrammatic illustration of an apparatus suitable for carrying out a continuous process.

We have illustrated our process as carried out using the type of apparatus and cooling process described in the aforementioned Burke et al., patents. A part, or all, of the process of the present invention, however, may be carried out in apparatus of different forms so long as the elements of the process are carried out.

Referring, first, to the batch operation as illustrated in Figure 1 of the drawings, the apparatus is as follows: This equipment consists of a vacuum cooler 1, wherein the solution is agitated by means of a rotating impeller 2, which is driven by gear 3 and motor 4. The solution rises outside of the central cylinder 5 and flows downwardly within the cylinder. The vapors boiling from the liquid in the cooler 1 proceed through the vapor line 6 to a condenser 7, wherein they might be condensed by cold water admitted through pipe 8 and exiting through pipe 9 to the collection tank 10. Non-condensible gases are removed by a vacuum pump 11. The rate of cooling can be accurately adjusted by regulating the amount of water admitted through pipe 8. The regulation can be automatic or by manual control of valve 12.

On completion of the cooling cycle, the contents of tank 1 are discharged through pipe 13 to a dewatering device. This dewateriing device may be a rotating filter 14, such as is illustrated. The filtrate proceeds through pipe 15 and may be used to dissolve more potash salts or it may be discarded. The granular material discharged by filter 14 proceeds through chute 16 to a rotary dryer 17. The dryer may be heated by any means, but we have elected to show a fire box 18 in which an oil burner may be inserted. The dry material discharges from dryer 17 through chute 19 to a screen 20 whereon the coarse crystals are separated from any dust or fine material. Some fine material and dust is always present because of abrasion in the handling of the crystals. This dust is rejected through chute 21 and the finished product is discharged from the screen through chute 22.

In the operation of the process, a hot concentrated solution of potassium chloride is pumped through line 23 into tank 1 until the tank has been filled to a level somewhat above the top of the inner cylinder 5. The agitator 2 is then started. The pH of the solution may be adjusted before the tank is filled or the pH may be adjusted within the tank itself. To adjust the pH, a sample of the solution is tested by some known means, and sufficient alkaline material is added through manhole 24 to bring the pH up to or above 8.5. In addition, a quantity of a conditioner is added through manhole 24. We prefer to use red lead, $Pb_3O_4$ and we add approximately one pound for each ton of potassium chloride in the solution. The manhole cover is then replaced and the vacuum pump 11 is started. By controlling the amount of water added through pipe 8, the contents of the tank 1 are cooled at the rate of between 0.5 to 1° F. per minute. We may start with a solution of potassium chloride at 200° F. and we may cool this solution to 100° F. This cooling will take from 100 to 200 minutes. In this type of cooling apparatus, using this particular type of agitator, we have found empirically that, at the start of cooling, the liquor must flow at a rate of 0.8 foot per second in its path around the cylinder 5. The gear 3 must be such that agitation can be increased as cooling proceeds. We have found that, at the end of cooling, when the temperature has reached 100°, the liquor flow must have increased to 3 feet per second. This increase in flow rate from 0.8 to 3 feet per second is made in small increments, during the cooling process, or can be made continuously by some automatic device. It must be emphasized that these flows are for this particular type of agitator and cooler and are entirely empirical.

When the cooling is completed, vacuum is broken on the system and the filter 14 is put in operation. The contents of tank 1 are discharged at a constant rate through pipe 13 and the solids are removed from the liquid by the filter. The coarse granular material discharged by the filter is dried in dryer 17 and finally screened on the screen 20.

We have found that somewhat larger crystals may be obtained if a certain portion of the material produced by this process is returned to tank 1 with each batch of liquor cooled. When adjusting the pH of the solution and adding the conditioner through manhole 24, we might, therefore, add several pounds of coarse granular material, as discharged through chute 22.

The process of our invention might be used to crystallize coarse granular potash from any concentrated potash liquor and has been used to so crystallize potash from the concentrated potash liquors described in U. S. Letters Patent No. 1,790,436. However, it is possible, also to dissolve potassium chloride, which is caked and dusty or is otherwise unsuitable, and to make coarse granular potash crystals from this unsuitable material. If such would be the plan, the filtrate from the filter 14 would be heated and used to dissolve the material. This concentrated solution would then be sent to tank 1 through pipe 23. Since the fine material removed by screen 30 is also an unsuitable material, it would also be dissolved in the filtrate from the filter 14.

In the following table, we have illustrated a typical operation of the process of the present invention and contrasted the results obtained with the results where either no proper nuclei inhibiting agent is employed where the pH is improperly adjusted, or where the agitation is improper and excessive. In the following tabulation, column A is the screen analysis of the product obtained by a typical operation of the process. In column B, the nuclei formation inhibiting agent was omitted. In column C, the pH was below 8.5 and, in column D, the agitation was improper or, i. e. excessive.

| Test | A | B | C | D |
|---|---|---|---|---|
| Nuclei inhibitor. | Lead | None | Lead | Lead |
| pH | Adjusted | Adjusted | Unadjusted | Adjusted |
| Speed of Agitation. | Controlled | Controlled | Controlled | Uncontrolled |

| Mesh | Cumulative Percentages | | | |
|---|---|---|---|---|
| +8 | 10.5 | | | |
| 9 | 17.8 | | | |
| 10 | 20.6 | | | |
| 12 | 22.5 | | | |
| 14 | 38.3 | | | |
| 16 | 55.2 | | | |
| 20 | 68.1 | | 1.0 | 3.3 |
| 24 | 77.3 | 4.0 | | 28.8 |
| 28 | 86.6 | 13.1 | 26.2 | 66.8 |
| 35 | 98.2 | 73.9 | 64.8 | 94.7 |
| 48 | 99.5 | 88.1 | 79.9 | 97.7 |
| −48 | (0.4) | (11.8) | (19.7) | (2.2) |
| Total | 99.9 | 99.9 | 99.6 | 99.9 |

The batchwise process described above will produce a very uniform, large crystal of potassium chloride. The process, as in all batchwise processes, is much easier to operate for uniform results than is a continuous process. However, a continuous process has the advantage that the cost per ton of product is lower. We have discovered that the processes of our invention may be carried out in apparatus designed to run continuously. The possible equipment for such a continuous method is illustrated in Figure 2.

In Figure 2 is shown a plurality of cooling bodies wherein the liquor is cooled in stages. The figure shows three of these cooling bodies (1, 2, and 3) though a larger number may be used. These cooling bodies are provided with agitators 4, and with condensers 5. A filter 6 removes the coarse granular potassium chloride from the cooler slurry and discharges the filter cake into dryer 7. The dried material is screened on screen 8 to remove dust, etc.

We have used equipment such as described to crystallize coarse granular potash continuously from concentrated potash liquors produced by the process of U. S. Patent No. 1,790,436. In operation, the hot concentrated potassium chloride solution is fed to the conditioning tank 9 through pipe 10. To this conditioning tank is added the conditioner. We prefer to use red lead ($Pb_3O_4$). The conditioning tank 9 is agitated by agitator 11, which assures that the conditioning agent is thoroughly mixed in the solution.

We do not need to add an alkali to the concentrated solution produced according to U. S. Patent No. 1,790,436 as this solution already contains sodium carbonate in sufficient quantity that the pH of the solution is well over 8.5 and is actually between 11 and 12.

The solution in conditioning tank 9 is fed continuously to cooler 1 through pump 12 and line 13. We maintain a sufficient vacuum on this cooler and sufficient flow of water to the condenser through pipe 14 that approximately one-tenth of the total cooling required is performed in cooler 1. As liquor continuously enters the cooler 1 through pipe 13, it overflows through pipe 15 to cooler 2. Within this cooler, we also maintain necessary vacuum and sufficient water through pipe 16 to perform further cooling which amounts to approximately three-tenths cooling. Cooler 2 overflows in turn through pipe 17 to cooler 3. Herein the liquor is cooled to the final temperature by vacuum and water added through pipe 18.

As the three cooler bodies are maintained at three separate temperatures, it is a necessary part of our invention that each cooler body should be agitated at a different speed. These agitating speeds must be determined empirically, but we have found in apparatus similar to the one described herein that a flow of 0.8 foot per second is adequate in cooler 1, while a flow of 3 feet per second is desirable in cooler 3. Cooler 2 requires a flow intermediate between that in cooler 1 and cooler 3.

The final slurry in cooler 3 overflows through pipe 19 to filter 6. The coarse granular potassium chloride is separated from the liquid on this filter, and the liquid is discharged through pump 20. The moist coarse granular potassium chloride proceeds through chute 21 into dryer 7. This dryer may be heated by an oil fire in fire box 22, or by some other means such as steam-heated coils. However, heated, the dried material discharges through chute 23 to the screen 8 where any dust or abraded particles may be separated and discharged through chute 24. The finished product is discharged through chute 25 and is ready for sale.

The product obtained by this continuous process is somewhat smaller in crystal size than that which may be obtained by a batch process. The difference lies in the fact that every nucleus of a potassium chloride crystal which forms in cooler 1 stays within the three coolers for an average period which is equal to the period required for optimum growth. It is unavoidable, however, that a portion of the crystals will escape from cooler to cooler and finally to the filter within in a shorter period than the optimum, and that others will remain within the coolers for longer periods. This tends to produce a gradation in size in the finished product. We have found, however, that the gradation is slight and that the material compares very favorably with that produced by the batchwise process. An improvement might be made in the equipment used, whereby the crystals discharging from each cooler body are graded according to size with some known apparatus such as a classifier. The fine crystals can then be returned to the cooler body while only the coarse crystals are permitted to advance through the system.

According to our further discovery, it is desirable to return some coarse granular potassium chloride produced by this process to the start of the cooling cycle. This return of some finished material aids in producing larger and more uniform crystals. We, therefore, may return some slurry taken from pipe 19 to the conditioning tank 9.

Screen analyses of materials produced by the continuous process described above are shown in columns A, B, and C of the table below. In these tests the liquors cooled were the same liquors used in the process of U. S. Patent No. 1,790,436. For comparison column D shows the screen analysis of potassium chloride derived from the process of U. S. Patent No. 1,790,436. Column E indicates the screen analysis of material produced by the batchwise process previously described.

| Screen Mesh (Tyler) | A Continuous Flow | B Continuous Flow | C Continuous Flow | D Continuous Flow | E Batchwise |
|---|---|---|---|---|---|
| 16 | 18.2 | 16.6 | 6.6 | 0.5 | 55.2 |
| 20 | 29.4 | 28.4 | 12.8 | 0.6 | 68.1 |
| 28 | 62.1 | 62.1 | 40.1 | 0.8 | 86.6 |
| 35 | 85.6 | 87.4 | 80.2 | 2.5 | 98.2 |
| 48 | 94.7 | 97.1 | 99.5 | 11.3 | 99.5 |
| 60 | 97.0 | 98.8 | 99.8 | 18.7 | |
| 80 | | | | 45.3 | |
| 100 | | | | 66.4 | |
| 200 | | | | 97.2 | |

While the particular examples of the process of the present invention herein specifically described are well adapted to carry out the objects of the invention, various modifications and changes may be made and this invention is of the scope set forth in the appended claims.

We claim:

1. A process for production of coarse granular potassium chloride, which process consists of crystallizing the potassium chloride from a hot saturated solution of same through cooling, which solution is maintained at a pH of above 8.5 throughout the crystallization operation, a nuclei formation retarding agent being added to the solution before crystallization, said nuclei formation retarding agent being selected from the class consisting of oxides and salts of iron, aluminum, thorium, zinc, bismuth and lead.

2. A process for the production of coarse granular potassium chloride in which the potassium chloride is crystallized from a hot saturated solution of the same through cooling, said process being characterized by the addition to the solution before cooling of a nuclei formation retarding agent selected from the class consisting of oxides and salts of iron, aluminum, thorium, zinc, bismuth and lead, and characterized by the addition to the solution before cooling of sufficient of a member selected from the class consisting of alkali metal hydroxides and alkali metal carbonates to maintain the solution at a pH of at least 8.5 during the cooling and crystallizing operations.

3. A process for the production of coarse granular potassium chloride by crystallization of potassium chloride from hot saturated solutions of the same through cooling characterized by the fact that the pH of the solution is maintained at at least 8.5 during cooling and crystallization and characterized by the addition of lead oxide $Pb_3O_4$ as a nuclei formation retarding agent.

4. A process for the production of coarse granular potassium chloride by crystallization of potassium chloride from hot saturated solutions of the same through cooling, which process is characterized by the pH of the solution being maintained above 8.5 throughout the cooling and crystallization, by the addition of a nuclei formation retarding agent to the solution before cooling and crystallization, said nuclei formation retarding agent being selected from the class consisting of oxides and salts of iron, aluminum, thorium, zinc, bismuth and lead, and by the use of a circulating well type of agitation and by the use of a cooling rate between 0.5 and 1.0° F. per minute.

5. A process for the production of coarse granular potassium chloride by crystallization of potassium chloride from hot saturated solutions of the same through cooling, which process is characterized by the pH of the solution being maintained above 8.5 throughout the cooling and crystallization, by the addition of a nuclei formation retarding agent to the solution before cooling and crystallization, said nuclei formation retarding agent being selected from the class consisting of oxides and salts of iron, aluminum, thorium, zinc, bismuth and lead, and by circulating the solution and crystals present at a rate in excess of the settling rate of the crystals present.

6. A process for the production of coarse granular potassium chloride by crystallization of potassium chloride from hot saturated solutions of the same through cooling, which process is characterized by the pH of the solution being maintained above 8.5 throughout the cooling and crystallization, by the addition of a nuclei formation retarding agent to the solution before cooling and crystallization, said nuclei formation retarding agent being selected from the class consisting of oxides and salts of iron, aluminum, thorium, zinc, bismuth and lead, and by circulating the solution and crystals present at a rate in excess of the settling rate of the crystals present, the cooling being maintained at between 0.5 and 1.0° F. per minute.

7. A process for the production of coarse granular potassium chloride by crystallization of potassium chloride from a hot saturated solution of the same through cooling in which process the solution is maintained at a pH above 8.5 during cooling and crystallization, a nuclei formation retarding agent is added selected from the class consisting of oxides and salts of iron, aluminum, thorium, zinc, bismuth and lead and in which the cooling is conducted at progressively increasing rates as the crystallization proceeds.

8. A process for the production of coarse granular potassium chloride by crystallizing potassium chloride from hot saturated solutions of the same through cooling in which process the pH of the solution is maintained above 8.5 and in which process there is added a nuclei formation retarding agent selected from the class consisting of oxides and salts of iron, aluminum, thorium, zinc, bismuth and lead, and in which process the rate of cooling and speed of circulation of the solution is selected to inhibit the nuclei formation and to produce said desirable coarse granular potassium chloride crystals.

9. A process for the production of coarse granular potassium chloride crystals by crystallization of potassium chloride from hot saturated solutions of the same through cooling, in which process the solution is maintained at a pH of at least 8.5 and a nuclei formation retarding agent is added selected from the class consisting of oxides and salts of iron, aluminum, thorium, zinc, bismuth and lead while cooling at progressively more rapid rates and circulating at progressively more rapid rates as crystallization proceeds and returning a portion of the coarse granular potassium chloride crystal product to the start of the operations.

10. A process of producing coarse granular potassium chloride crystals by crystallization of potassium chloride from hot saturated solutions of the same through cooling, in which process the pH of the solution is maintained above 8.5 and in which process a nuclei formation retarding agent is added before cooling and crystallization, said agent being selected from the class consisting of oxides and salts of iron, aluminum, thorium, zinc, bismuth and lead, the cooling being conducted continuously in a plurality of separate crystallizing vessels through which the solution progressively flows, the rate of cooling and circulation of the solution being increased in successive vessels.

11. A process of producing coarse granular potassium chloride crystals by crystallization of potassium chloride from hot saturated solutions of the same through cooling, in which process the pH of the solution is maintained above 8.5 and in which process a nuclei formation retarding agent is added before cooling and crystallization, said agent being selected from the class consisting of oxides and salts of iron, aluminum, thorium, zinc, bismuth and lead, the cooling being conducted continuously in a plurality of separate crystallizing vessels through which the solution progressively flows, the rate of cooling and circulation of the solution being increased in successive vessels and separating from the product of the solution from the last vessel a portion of the coarse granular potassium chloride and adding the same to the solution in the first crystallizing vessel.

ARTHUR KENNETH JOHNSON.
HENRY B. SUHR.

No references cited.